(12) United States Patent
Chen et al.

(10) Patent No.: US 9,539,793 B2
(45) Date of Patent: Jan. 10, 2017

(54) MULTILAYER FILM

(75) Inventors: Changping Chen, Nanjing (CN); John Scheirs, Edithvale (AU); Markus Leufgens, Frankston (AU)

(73) Assignee: TRISTANO PTY LTD., Hawthorn, Victoria (AU)

(*) Notice: Subject to any disclaimer, the term of this patent is extended or adjusted under 35 U.S.C. 154(b) by 33 days.

(21) Appl. No.: 13/386,371

(22) PCT Filed: Jul. 20, 2010

(86) PCT No.: PCT/AU2010/000923
§ 371 (c)(1),
(2), (4) Date: Aug. 28, 2012

(87) PCT Pub. No.: WO2011/009165
PCT Pub. Date: Jan. 27, 2011

(65) Prior Publication Data
US 2012/0315416 A1 Dec. 13, 2012

(30) Foreign Application Priority Data

Jul. 23, 2009 (AU) ................................. 2009903455

(51) Int. Cl.
| B29C 47/06 | (2006.01) |
| B32B 27/08 | (2006.01) |
| B32B 27/32 | (2006.01) |
| B32B 9/02 | (2006.01) |
| B32B 27/30 | (2006.01) |
| C08L 3/02 | (2006.01) |
| C08L 23/06 | (2006.01) |
| C08L 91/06 | (2006.01) |

(52) U.S. Cl.
CPC ............... *B32B 27/08* (2013.01); *B32B 9/02* (2013.01); *B32B 27/308* (2013.01); *B32B 27/32* (2013.01); *B32B 27/327* (2013.01); *C08L 3/02* (2013.01); *C08L 23/06* (2013.01); *B32B 2250/03* (2013.01); *B32B 2250/40* (2013.01); *B32B 2270/00* (2013.01); *B32B 2307/406* (2013.01); *B32B 2307/412* (2013.01); *B32B 2307/518* (2013.01); *B32B 2307/54* (2013.01); *B32B 2307/558* (2013.01); *B32B 2307/75* (2013.01); *B32B 2439/06* (2013.01); *B32B 2439/70* (2013.01); *B32B 2553/026* (2013.01); *C08L 91/06* (2013.01); *Y10T 428/1334* (2015.01); *Y10T 428/23* (2015.01)

(58) Field of Classification Search
CPC ............ Y10T 428/13; Y10T 428/1334; Y10T 428/23; Y10T 428/1352; Y10T 428/1393; Y10T 428/31971; C08L 23/02; C08L 23/04; C08L 23/06; C08L 23/08; C08L 23/69; C08L 91/06; C08L 3/02; C08L 2205/03; C08L 2205/035; C08J 2302/00; C08J 2302/02

USPC ............ 428/35.2, 35.7, 35.9, 447, 451, 508; 524/18, 37, 39, 40, 41, 42, 46, 47, 52, 524/522, 556, 53; 523/128, 220
See application file for complete search history.

(56) References Cited

U.S. PATENT DOCUMENTS

| 4,337,181 A * | 6/1982 | Otey et al. ..................... 523/128 |
| 4,784,863 A | 11/1988 | Lustig et al. |
| 4,977,033 A * | 12/1990 | Akao ..................... B32B 27/32 428/215 |
| 5,051,266 A | 9/1991 | Juhl et al. |
| 5,108,807 A | 4/1992 | Tucker |
| 5,314,754 A | 5/1994 | Knight |
| 5,314,934 A | 5/1994 | Tomka |
| 5,415,827 A | 5/1995 | Tomka et al. |
| 5,449,708 A | 9/1995 | Schiltz |
| 5,472,791 A * | 12/1995 | Landoni ................. B32B 27/32 428/34.9 |
| 5,512,378 A | 4/1996 | Bastioli et al. |
| 5,566,647 A | 10/1996 | Pascal |
| 5,654,353 A | 8/1997 | Li et al. |
| 5,837,358 A | 11/1998 | Bauer et al. |
| 6,033,514 A * | 3/2000 | Davis ..................... B29C 55/023 156/244.11 |
| 6,231,970 B1 | 5/2001 | Andersen et al. |
| 6,242,102 B1 * | 6/2001 | Tomka ......................... 428/451 |
| 6,312,823 B1 | 11/2001 | El-Afandi et al. |
| 6,348,524 B2 | 2/2002 | Bastioli et al. |
| 6,605,657 B1 | 8/2003 | Favis et al. |
| 6,844,380 B2 | 1/2005 | Favis et al. |
| 2003/0119949 A1* | 6/2003 | Favis et al. ..................... 524/47 |
| 2003/0225218 A1* | 12/2003 | Petroski et al. ............... 525/191 |
| 2007/0117905 A1* | 5/2007 | Toyoda et al. ................. 524/487 |
| 2008/0287592 A1 | 11/2008 | Favis et al. |

(Continued)

FOREIGN PATENT DOCUMENTS

| CN | 1074451 | 7/1993 |
| CN | 1113918 | 12/1995 |
| CN | 1071878 | 9/2001 |
| EP | 0 417 828 A1 | 3/1991 |
| EP | 0 471 402 A3 | 2/1992 |
| EP | 0942040 B1 * | 3/1998 |
| EP | 0 942 040 A1 | 9/1999 |

(Continued)

OTHER PUBLICATIONS

Rees, Martin. Mold Engineering, 1995, Hanser:Munich, 2nd edition, p. 588, Print.*

(Continued)

*Primary Examiner* — Lee Sanderson
(74) *Attorney, Agent, or Firm* — Foley & Lardner LLP

(57) ABSTRACT

The invention relates to a multilayer film comprising at least a tri-layer structure, said tri-layer structure being made up of a core polymer layer interposed between two covering polymer layers that each comprise polyethylene, wherein the core polymer layer comprises a melt blend of polyethylene, thermoplastic starch, and ethylene acrylic acid copolymer.

17 Claims, No Drawings

(56) References Cited

U.S. PATENT DOCUMENTS

2009/0179069 A1    7/2009  Schmidt et al.

FOREIGN PATENT DOCUMENTS

| EP | 0 965 615 B1 | 12/1999 |
| EP | 1 265 957 B1 | 12/2002 |
| JP | H04-505593 A | 10/1992 |
| JP | H06-206252 A | 7/1994 |
| JP | 3137198 B2 | 12/2000 |
| JP | 2003-518541 A | 6/2003 |
| JP | 2006-088541 | 4/2006 |
| WO | WO-01/48078 A1 | 7/2001 |
| WO | WO-2007/118828 A1 | 10/2007 |
| WO | WO-2009/095622 | 8/2009 |
| WO | WO-2010/131134 A2 | 11/2010 |

OTHER PUBLICATIONS

Baker Hughes Inc. Polywax Polyethylenes, Feb. 24, 2008, Online, available at http://www.yinsen.net/file/wax/datasheet/Polywax.pdf.*

Japanese Office Action for Application No. 2012-520863 dated Jan. 14, 2014.

* cited by examiner

MULTILAYER FILM

FIELD OF THE INVENTION

The present invention relates in general to multilayer films, and in particular to multilayer films comprising polyethylene. The invention also relates to a process for producing such multilayer films, and to articles comprising or produced from the films.

BACKGROUND OF THE INVENTION

To meet ever increasing performance demands such as tear and puncture resistance, gas impermeability, sealability and clarity, modern packaging films can be quite complex in terms of both their structure (e.g. multilayer) and composition (e.g. type of polymer(s)).

Due to its excellent physical and mechanical properties, processability and clarity, polyethylene is used extensively in the manufacture of packaging films. However, polyethylene is to date ultimately derived from crude oil, and there is now a concerted effort in the packaging industry to avoid or at least reduce the use of such oil based polymers in favour of sustainable, bio-derived alternatives.

Much of the research to date in developing such sustainable, bio-derived alternatives has focussed on utilising naturally occurring bio-polymers such as starch. Starch is an attractive alternative in that it is derived from renewable resources (i.e. plant products), readily available and relatively inexpensive.

A number of approaches have been adopted for incorporating starch into polyethylene based films. For example, monolayer and multilayer films have been prepared using a melt blend of polyethylene and starch. Although such film products comprise a reduced polyethylene content, their manufacture can be problematic. For example, the relatively hydrophilic nature of starch is inherently incompatible with the relatively hydrophobic nature of polyethylene. Accordingly, starch has a tendency to migrate to the surface of a starch/polyethylene meltstream during melt processing and collect at certain parts of the processing equipment such as the die lips. Starch or oxidised residue thereof deposited on the die lips can then intermittently pick off into passing film causing holes and defects in the resulting film product.

Furthermore, the incompatibility of starch within a polyethylene matrix typically results in the formation of a multi-phase morphology having a high interfacial tension that often negatively impacts on the physical and mechanical properties of a resulting polymer film. For example, the presence of starch within a polyethylene film can promote significant reductions in the films gloss, elongation properties, toughness, tear strength, puncture resistance and clarity.

An opportunity therefore remains to address or ameliorate one or more disadvantageous or shortcomings associated with conventional film products comprising polyethylene and starch, or to at least provide a useful alternative.

SUMMARY OF THE INVENTION

The present invention therefore provides a multilayer film comprising at least a tri-layer structure, said tri-layer structure being made up of a core polymer layer interposed between two covering polymer layers that each comprise polyethylene, wherein the core polymer layer comprises a melt blend of polyethylene, thermoplastic starch, and ethylene acrylic acid copolymer.

The present invention further provides a process for producing a multilayer film comprising at least a tri-layer structure, the process comprising forming the tri-layer structure by co-extruding a core polymer layer interposed between two covering polymer layers that each comprise polyethylene, wherein the core polymer layer comprises a melt blend of polyethylene, thermoplastic starch, and ethylene acrylic acid copolymer.

The present invention also provides an article comprising or produced from a multilayer film according to the present invention.

In one embodiment, the core polymer layer comprises polyolefin wax.

The tri-layer structure of the multilayer film in accordance with the invention can exhibit excellent physical and mechanical properties, and can also advantageously be produced effectively and efficiently using conventional co-extrusion equipment.

A particular advantage afforded by the tri-layer structure is its excellent optical properties. Surprisingly, the tri-layer structure can exhibit optical properties such as haze, light transmission and gloss that are similar if not equivalent to a conventional polyethylene film. This is notable in that conventional polyethylene/starch based films typically have poor optical properties.

The excellent optical properties of the tri-layer structure in accordance with the invention renders it suitable for use in numerous packaging applications traditionally considered unsuitable for starch based polyethylene films due to their poor optical properties such as unacceptable opacity.

Without wishing to be limited by theory, it is believed that the tri-layer structure of the multilayer films reduces the degree of light scattering off starch domains present within the core polymer layer. In particular, the sandwiching effect on the core polymer layer induced by the two covering polymer layers, coupled with excellent compatibility of starch with the components of the core polymer layer, are believed to reduce the degree of light scattering off starch domains within the core polymer layer, thereby improving the optical properties of the multilayer film. Notably, the core polymer layer per se (i.e. as a monolayer) exhibits quite poor optical properties relative to the tri-layer structure and also relative to a conventional polyethylene film.

Further aspects of the invention are described in more detail below.

DETAILED DESCRIPTION OF THE INVENTION

The core polymer layer of multilayer films in accordance with the invention comprises a melt blend of polyethylene, thermoplastic starch, and ethylene acrylic acid copolymer. By comprising a "melt blend" of these components is meant that the components have been melt mixed to afford an integral intimate blend of the components. It will be appreciated that in the context of the multilayer films per se, the expression "melt blend" will generally be used to describe the blend in a solid state. However, those skilled in the art will appreciate that in the context of producing the multilayer films the expression "melt blend" may also extend to describe the blend in a molten state.

Depending upon the desired properties of the multilayer film, the nature of polyethylene used in the core polymer layer may be varied. For example, the polyethylene may be selected from one or more of very low density polyethylene (VLDPE), low density polyethylene (LDPE), linear low density polyethylene (LLDPE), medium density polyethylene (MDPE), and high density polyethylene (HDPE).

In one embodiment, the core polymer layer comprises VLDPE, which is generally characterised as having a density of less than 0.905 g/cm$^3$. Generally, the VLDPE will have a density ranging from about 0.85 g/cm$^3$ to 0.905 g/cm$^3$, for example from about 0.88 g/cm$^3$ to 0.905 g/cm$^3$. VLDPE is also known in the art as ultra low density polyethylene (ULDPE), and is generally a copolymer of ethylene and one or more α-olefins such as 1-butene, 1-hexene, and 1-octene.

The VLDPE will generally have a melt flow indexed at 190° C./2.16 kg of about 0.5 g/10 min to about 10 g/10 min.

Suitable VLDPE that may be used in accordance with the invention includes, but is not limited to, an ethylene/octene copolymer having a density of about 0.904 g/cm$^3$ and a melt flow index at 190° C./2.16 kg of about 4 g/10 min, an ethylene/butene copolymer having a density of about 0.884 g/cm$^3$ and a melt flow index at 190° C./2.16 kg of about 0.7 g/10 min, and an ethylene/butene copolymer having a density of about 0.8985 g/cm$^3$ and a melt flow index at 190° C./2.16 kg of about 5 g/10 min.

The use of VLDPE in the core polymer layer is believed to facilitate compatibilisation of the components within the layer.

Reference herein to a density or melt flow index (MFI) is intended to mean a density or melt flow index determined in accordance with ASTM D792 and ASTM D1238, respectively.

LDPE is generally characterised as having a density in the range of 0.910 g/cm$^3$ to 0.940 g/cm$^3$. LDPE that may be used in accordance with the invention includes, but is not limited to, that having a melt flow index at 190° C./2.16 kg of about 0.2 g/10 min to about 7 g/10 min.

In one embodiment of the invention, the core polymer layer comprises VLDPE and LDPE.

LLDPE is generally characterised as having a density ranging from 0.915 g/cm$^3$ to 0.925 g/cm$^3$, MDPE is generally characterised as having a density ranging from 0.926 g/cm$^3$ to 0.94 g/cm$^3$, and HDPE is generally characterised as having a density ranging of greater or equal to 0.941 g/cm$^3$.

Suitable grades of VLDPE, LDPE, LLDPE, MDPE and HDPE for use in accordance with the invention may be obtained commercially.

The polyethylene in the core polymer layer will generally be present in an amount ranging from about 5 wt % to about 85 wt %, relative to the other components present in the layer. In one embodiment, the polyethylene within the core polymer layer is present in an amount ranging from about 25 wt % to about 85 wt %, for example about 50 wt % to about 85 wt % or from about 75 wt % to about 85 wt %, relative to the other components present in the layer.

In one embodiment of the invention, the total polyethylene content in the core layer is made up of about 1 wt % to about 10 wt % VLDPE and about 90 wt % to about 99 wt % LDPE.

The core polymer layer in accordance with the invention also comprises ethylene acrylic acid copolymer (EAA). Those skilled in the art will appreciate that EAA is a copolymer of ethylene and acrylic acid. Generally, the acrylic acid content of the copolymer will range from about 5-20% for example 8-15%. The EAA will also generally have a melt flow index at 190° C./2.16 kg ranging from about 10 g/10 min to about 20 g/10 min.

Suitable grades of EAA for use in accordance with the invention may be obtained commercially.

The EAA will generally be present in the core polymer layer in an amount ranging from about 2 wt % to about 25 wt %, relative to the other components present in the layer. In one embodiment, the core polymer layer comprises about 2 wt % to about 15 wt % EAA, for example about 2 wt % to about 10 wt %, or from about 2 wt % to about 5 wt % EAA, relative to the other components present in the layer.

Without wishing to be limited by theory, it is believed that the EAA present within the core polymer layer facilitates compatibilisation of all components within the layer.

The core polymer layer also comprises thermoplastic starch (TPS). Those skilled in the art will appreciate that TPS is a destructured form of starch comprising one or more plasticisers.

Starch is found chiefly in seeds, fruits, tubers, roots and stem pith of plants, and is a naturally derived polymer made up of repeating glucose groups linked by glucosidic linkages in the 1-4 carbon positions. Starch consists of two types of alpha-D-glucose polymers: amylose, a substantially linear polymer with molecular weight of about 1×10$^5$; and amylopectin, a highly branched polymer with very high molecular weight of the order 1×10$^7$. Each repeating glucose unit typically has three free hydroxyl groups, thereby providing the polymer with hydrophilic properties and reactive functional groups. Most starches contain 20 to 30% amylose and 70 to 80% amylopectin. However, depending on the origin of the starch the ratio of amylose to amylopectin can vary significantly. For example, some corn hybrids provide starch with 100% amylopectin (waxy corn starch), or progressively higher amylose content ranging from 50 to 95%. Starch usually has a water content of about 15 wt %. However, the starch can be dried to reduce its water content to below 1%. An amount of starch per se used in accordance with the invention is intended to include the mass of water associated with the starch.

The process in accordance with the present invention can advantageously be performed using starch having a water content from about 1% to about 15%, for example from about 1% to about 5%, or from about 5% to about 15%, or from about 10% to about 15%.

Starch typically exists in small granules having a crystallinity ranging from about 15 to 45%. The size of the granules may vary depending upon the origin of the starch. For example, corn starch typically has a particle size diameter ranging from about 5 μm to about 40 μm, whereas potato starch typically has a particle size diameter ranging from about 50 μm to about 100 μm.

This "native" or "natural" form of starch may also be chemically modified. Chemically modified starch includes, but is not limited to, oxidised starch, etherificated starch, esterified starch, cross-linked starch or a combination of such chemical modifications (e.g. etherificated and esterified starch). Chemically modified starch is generally prepared by reacting the hydroxyl groups of starch with one or more reagents. The degree of reaction, often referred to as the degree of substitution (DS), can significantly alter the physiochemical properties of the modified starch compared with the corresponding native starch. The DS for a native starch is designated as 0 and can range up to 3 for a fully substituted modified starch. Depending upon the type of substituent and the DS, a chemically modified starch can exhibit considerably different hydrophilic/hydrophobic character relative to native starch.

Both native and chemically modified starch generally exhibit poor thermoplastic properties. To improve such properties, the starch may be converted to TPS by means well known in the art. For example, native or chemically modified starch may be melt processed with one or more plasticisers. Polyhydric alcohols are generally used as plasticisers in the manufacture of TPS.

Reference herein to a wt % of TPS is therefore intended to include the collective mass of both the starch and plasticiser constituent components of the TPS.

The starch from which the TPS may be derived includes, but is not limited to, corn starch, potato starch, wheat starch, soy bean starch, tapioca starch, hi-amylose starch or combinations thereof.

Where the starch is chemically modified, it will generally be etherificated or esterified. Suitable etherificated starches include, but are not limited to, those which are substituted with ethyl and/or propyl groups. Suitable esterified starches include, but are not limited to, those that are substituted with actyl, propanoyl and/or butanoyl groups.

In one embodiment of the invention, the starch used to prepare the TPS is native starch, for example native starch selected from one or more of corn starch, potato starch, wheat starch, soy bean starch, tapioca starch, and hi-amylose starch.

In one embodiment of the invention, the starch used to prepare the TPS is corn starch or corn starch acetate having a DS>0.1.

The TPS will generally also comprise one or more polyhydric alcohol plasticisers. Suitable polyhydric alcohols include, but are not limited to glycerol, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neo-pentyl glycol, trimethylol propane, pentaerythritol, sorbitol, mannitol and the acetate, ethoxylate, and propoxylate derivatives thereof.

In one embodiment, the TPS comprises glycerol and/or sorbitol plasticisers.

The plasticiser content of the TPS will generally range from about 5 wt % to about 50 wt %, for example from about 10 wt % to about 40 wt %, or from about 10 wt % to about 30 wt %, relative to the combined mass of the starch and plasticiser components.

The TPS will generally be present in the core polymer layer in an amount ranging from about 10 wt % to about 80 wt %, relative to the other components present in the layer. In one embodiment, the TPS is present within the core polymer layer in an amount ranging from about 10 wt % to about 60 wt %, for example from about 10 wt % to about 40 wt % or from about 10 wt % to about 20 wt %, relative to the other components present in the layer.

In one embodiment, the core polymer layer comprises polyethylene in an amount ranging from about 5 wt % to about 85 wt %, ethylene acrylic acid copolymer in an amount ranging from about 2 wt % to about 25 wt %, and TPS in an amount ranging from about 10 wt % to about 80 wt %.

In a further embodiment, the core polymer layer comprises polyethylene in an amount ranging from about 60 wt % to about 85 wt %, ethylene acrylic acid copolymer in an amount ranging from about 2 wt % to about 10 wt %, and TPS in an amount ranging from about 10 wt % to about 20 wt %.

Without wishing to be limited by theory, it is believed that the core polymer layer comprises a highly compatibilised blend of polyethylene, ethylene acrylic acid copolymer and TPS. In particular, it is believed that at least the TPS and polyethylene phase domains can be provided with a co-continuous morphology. By "co-continuous phase morphology" in a context of the TPS and polyethylene phase domains is intended to mean the topological condition in which a continuous path through either phase domain may be drawn to all phase domain boundaries without crossing any phase domain boundary.

The core polymer layer in accordance with the invention may further comprise one or more other polymer such as ethylene vinyl acetate copolymer (EVA). In that case, the one or more other polymer such as EVA will generally be present in an amount ranging from about 0.2 wt % to about 2 wt %, relative to the other components present in the layer.

The core polymer layer in accordance with the invention may also comprise polyolefin wax. The expression "polyolefin wax" is intended to mean a low molecular weight polyolefin. By "low" molecular weight is mean a number average molecular weight (Mn) of less than about 5000, less than about 4000, or less than about 3000.

Reference herein to molecular weight (Mn) is that as measured by gel permeation chromatography (GPC).

The polyolefin wax will generally be prepared by thermal or chemical degradation of a polyolefin or from the partial polymerisation (i.e. oligomerisation) of olefins.

In one embodiment, the polyolefin wax has a number average molecular weight (Mn) ranging from about 250 to about 3500.

The polyolefin wax will generally be a homopolymer or copolymer of ethene, propene and one or more other α-olefins.

In one embodiment, the polyolefin wax is a polyethylene wax.

For avoidance of any doubt, where the polyolefin wax is a polyethylene wax, the "polyethylene wax" should not be considered as part of the "polyethylene" content of the core polymer layer. In other words, the polyethylene content of the core polymer layer is not intended to embrace any polyethylene wax that may also be present in the layer.

The polyolefin wax may also be substituted with one or more polar moieties. For example, the polyolefin wax may be an oxidized polyolefin wax.

In one embodiment, the polyolefin wax has an MFI ranging from about 2000 to about 4000 g/10 min, or about 2500 to about 3500 g/10 min, or about 2750 to about 3250 g/10 min, or about 3000 g/10 min.

In one embodiment, the polyolefin wax has a melting point or melting range greater than about 95° C.

In a further embodiment, the polyolefin wax has a melting point or melting range falling within the temperature range of about 95° C. to about 120° C.

Reference to the melting point or melting range of the polyolefin wax herein is that measured by Differential Scanning Calorimetry (DSC) at a heat rate of 10° C./min according to ASTM 3417.

When used, the polyolefin wax will generally be present in an amount ranging from about 0.2 wt % to about 2 wt %, or about 0.2 wt % to about 1 wt %, relative to the other components present in the core polymer layer.

The core polymer layer in accordance with the invention may also comprise one or more additives. Such additives may include fillers (e.g. calcium carbonate, talc, clays (e.g. montmorillonite) and titanium dioxide); pigments; antistatic agents; and processing aids e.g. calcium stearate, steric acid, magnesium stearate, sodium stearate, oleamide, stearamide and erucamide.

If used, such additives will generally be present in amount ranging from about 0.1 wt % to about 0.4 wt %, relative to the other components present in the core polymer layer.

In addition to the core polymer layer, the tri-layer structure in accordance with the invention comprises two covering polymer layers that in effect sandwich (i.e. each make contact with) the core polymer layer. The covering polymer layers comprise polyethylene. Generally, the polyethylene in the covering polymer layers will be selected from one or more of LLDPE, LDPE, MDPE, and HDPE.

Suitable grades of polyethylene that may be used in the covering polymer layers include those herein described.

In one embodiment of the invention, the grade(s) of polyethylene used in the covering polymer layers is food contact compliant. Where the polyethylene used in the covering polymer layers is food contact compliant, the tri-layer structure of the multilayer films can itself advantageously be food contact compliant.

By the polyethylene, tri-layer structure or multilayer film being "food contact compliant" is meant that they are compliant with EC directive 2002/72/EC. According to this Directive, plastic materials or articles shall not transfer their constituents to foodstuffs in quantities exceeding the overall migration limit of 60 mg/kg (by weight of foodstuff) or 10 mg/dm$^2$ (by surface area of the article or material).

The covering polymer layers will generally comprise at least 50 wt % polyethylene, for example at least 70 wt % or at least 90 wt %, or at least 95 wt % of polyethylene relative to other components present in the layers.

In one embodiment, the covering polymer layers each consist essentially of polyethylene.

The covering polymer layers may also each comprise one or more additives. Such additives may include fillers (e.g. calcium carbonate, talc, clays (e.g. montmorillonite) and titanium dioxide); pigments; anti-static agents; and processing aids such as slip and anti-blocking additives (e.g. calcium carbonate, talc, clays (e.g. montmorillonite), calcium stearate, steric acid, magnesium stearate, sodium stearate, oleamide, stearamide and erucamide).

If present, such additives will generally be present in amount ranging from about 0.1 wt % to about 0.4 wt %, relative to the other components present in a given covering polymer layer.

There is no particular limitation concerning the thickness of each layer that makes up the tri-layer structure. For example, the thickness of the core polymer layer may range from about 5 micron to about 40 micron, for example from about 10 micron to about 25 micron.

Each covering polymer layer may be of the same or different thickness and/or composition. Generally, the covering polymer layers will have a similar or substantially the same thickness and/or composition.

In one embodiment, the covering polymer layers each have a thickness ranging from about 2 micron to about 15 micron, for example from about 5 micron to about 10 micron.

In addition to the tri-layer structure, the multilayer film in accordance with the invention may comprise one or more additional layers on one or both of the covering polymer layers. For example, the multilayer film in accordance with the invention may comprise the tri-layer structure adjacent one or more layers of material. The tri-layer structure may, for example, be interposed between two or more layers of material. There is no particular limitation concerning the composition of such additional layers of the multilayer film. For example, the additional layer(s) may be a polymer layer selected from, for example, a polyolefin such as polypropylene or polyethylene, a polyester, a polyamide and a copolymer of ethylene and one or more co-monomers such as vinyl acetate, vinyl alcohol, acrylic acid and meth acrylic acid. The additional may also be non-polymeric, for example a metal foil layer.

The additional layers may be associated with the tri-layer structure by means of co-extrusion and/or lamination. In the case of lamination, a suitable tie or adhesive layer may be employed to adhere the tri-layer structure to the additional layers.

The tri-layer structure may of course in its own right be a multilayer film in accordance with the invention.

Depending on the application of the multilayer films in accordance with the invention, it may be desirable to incorporate an antistatic agent as an additive in at least the two outermost layers of the film. For example, where the tri-layer structure is in its own right the multilayer film, an antistatic additive may be incorporated into each of the two covering polymer layers.

In one embodiment of the invention, an antistatic additive is incorporated into each of the two covering polymer layers.

Suitable antistatic agents include quaternary ammonium antistatic agents.

The antistatic additives may be present in amount ranging from about 0.1 wt % to about 0.4 wt %, relative to the other components present in a given polymer layer.

Depending on the application of the multilayer films in accordance with the invention, it may be desirable to incorporate an anti-blocking and/or slip agent as an additive in at least the two outermost layers of the film. For example, where the tri-layer structure is in its own right the multilayer film, an anti-blocking and/or slip additive may be incorporated into each of the two covering polymer layers.

In one embodiment of the invention, an anti-blocking and/or slip additive is incorporated into each of the two covering polymer layers.

Suitable slip additives include migratory slip additives (e.g. oleamide, stearamide or erucamide) and non-migratory slip additives (e.g. polysiloxanes).

Suitable anti-blocking additives include calcium carbonate, talc, clays (e.g. montmorillonite).

The anti-blocking and/or slip additive may be present in amount ranging from about 0.1 wt % to about 0.4 wt %, relative to the other components present in a given polymer layer.

The tri-layer structure exhibits excellent physical and mechanical properties that may be imparted to the multilayer film.

In one embodiment, the tri-layer structure in accordance with the invention exhibits a haze as measured by ASTM D 1003 of no more than about 25%, or no more than about 20%, or no more than about 15%, or no more than about 10%, or even no more than about 5%, relative to the haze as measured according to ASTM D 1003 of the tri-layer structure absent the core polymer layer (i.e. relative to the haze of only the combined covering polymer layers—as a bi-layer structure).

In one embodiment, the tri-layer structure in accordance with the invention exhibits a light transmission as measured by ASTM D 1003 of more than about 75%, or more than about 80%, or more than about 85%, or more than about 90%, or even more than about 95%, relative to the light transmission as measured according to ASTM D 1003 of the tri-layer structure absent the core polymer layer (i.e. relative to the light transmission of only the combined covering polymer layers—as a bi-layer structure).

In one embodiment, the tri-layer structure or the multilayer film in accordance with the invention may be printed or reverse printed and/or laminated on to a printed substrate.

Such an embodiment takes advantage of the superb clarity that characterises the tri-layer structure.

The multilayer film in accordance with the invention may be prepared by a process comprising forming the tri-layer structure by co-extruding the core polymer layer interposed between the two covering polymer layers. Conventional co-extrusion equipment and techniques can advantageously be used to produce the structure. Generally at least the tri-layer structure will be produced by multi-layer cast or blown film co-extrusion.

As used herein, the term "extrusion", or its variants such as "extruded", "extrudes", "extruding", etc, is intended to define a process of forcing molten polymer through a forming die. Generally, the polymer will be melt processed and forced through the die using continuous extrusion equipment such as single screw extruders, twin screw extruders, and other multiple screw extruders. Melt processing is typically conducted for sufficient time and at a suitable temperature to promote intimate mixing between the components of the composition being melt processed. Those skilled in the art will appreciate that melt processing is generally performed within a suitable temperature range, and that this temperature will vary depending upon the nature of the polymer(s) being processed.

Generally, co-extrusion of the two covering polymer layers and the core polymer layer will comprise feeding by extrusion the respective polymer melt streams into a die such as a slot die or an annular die so as to combine the melt streams into a tri-layer structure of the appropriate construction. The resulting tri-layer structure is then typically rapidly quenched and stretched so as to form a multilayer film. Additional polymer melt streams may of course also be introduced to the die to increase the number of layers of the resulting film.

The co-extruded covering polymer layers may comprise one or more additives as herein described.

In one embodiment, the co-extruded covering polymer layers are co-extruded covering polyethylene layers as herein described.

The co-extruded core polymer layer may be itself prepared by any suitable means. For example, polyethylene, ethylene acrylic acid copolymer and TPS and/or its constituent components may be combined in the appropriate proportion and extruded. This extrudate may be directly co-extruded with the covering polymer layers.

Alternatively, a composition comprising polyethylene, ethylene acrylic acid copolymer and TPS and/or its constituent components may be melt processed and stored in the form of pellets for future use. The pellets may then be melt processed, optionally with additional polyethylene, to form the core polymer layer in accordance with the invention. The resulting extrudate can then be co-extruded with the covering polymer layers.

By the "constituent components" of the TPS is meant the individual ingredients that are used to prepare the TPS (e.g. starch and one or more plasticisers as herein described). Thus, in preparing the core polymer layer, the TPS may be prepared in advance from its constituent components and then melt processed with the polyethylene and ethylene acrylic acid copolymer. Alternatively, the TPS may be prepared in situ by melt processing its constituent components with the polyethylene and ethylene acrylic acid copolymer.

In one embodiment, a concentrate or masterbatch of polyethylene, acrylic acid copolymer and TPS is first prepared and is subsequently extruded (i.e. melt processed) with additional polyethylene to form the core polymer layer. This approach has been found to be particularly effective at promoting compatibilisation of all components present in the core polymer layer.

Thus, the co-extruded core polymer layer can be formed by melt processing with polyethylene a melt blended composition comprising polyethylene, ethylene acrylic acid copolymer and TPS. For convenience, such a melt blended composition comprising polyethylene, ethylene acrylic acid copolymer and TPS may be described as a core polymer layer masterbatch or concentrate. By being a "melt blended" composition is meant that the composition is a melt blend of the stated components and not a mere admixture of the components.

Where a core polymer layer masterbatch or concentrate is used in preparing a multilayer film in accordance with the invention it will generally comprise about 5 to about 25 wt % of polyethylene, about 5 to about 25% of ethylene acrylic acid copolymer and about 50 to about 80 wt % of TPS. Such a masterbatch or concentrate will generally be extruded with polyethylene to form the core polymer layer in an amount ranging from about 20 to 40 wt % of the concentrate or masterbatch and about 60 to 80 wt % of the polyethylene.

For avoidance of any doubt, the polyethylene, ethylene acrylic acid copolymer and TPS used in preparing such a core polymer layer masterbatch or concentrate, and also the polyethylene that is to be extruded with the masterbatch or concentrate to form the core polymer layer in accordance with the invention, are the same as those previously described.

The core polymer layer masterbatch or concentrate can be readily prepared by melt processing in appropriate proportions the polyethylene, ethylene acrylic acid copolymer and TPS and/or its constituent components as herein described.

In one embodiment, the starch used to prepare the TPS has a water content ranging from about 1% to about 15%, for example from about 1% to about 5%, or from about 5% to about 15%, or from about 10% to about 15%.

Where the core polymer layer is to comprise a further polymer such as EVA and/or one or more additives as herein described, and the core polymer layer is to be prepared using the aforementioned masterbatch or concentrate, the one or more polymers and/additives will generally be incorporated in the masterbatch or concentrate composition in an appropriate amount.

The present invention also provides for an article comprising or produced from a multilayer film according to the present invention. The article may itself be simply in the form of a film. Alternatively, the article may be in the form of bags such as bread bags and bubble cushioning packaging such as transit bubble packaging, air pillow protective packaging and air cellular packaging.

Embodiments of the invention are further described with reference to the following non-limiting examples.

EXAMPLES

Example 1

Part A: Preparation of Core Polymer Layer Masterbatch or Concentrate 50 kg of corn starch having a water content of less than 1 wt. %, 12 kg of glycerol, 10 kg of sorbitol, 18 kg of ethylene acrylic acid (EAA) (9% acid, melt flow index=20), 10 kg VLLDPE (Dowlex 9004, 2 g/10 mins.), 7 kg LDPE (MFI>0.5 g/10 mins), 0.7 kg calcium stearate and 0.3 kg stearic acid were melt mixed in a ZSK-65 Twin Screw Extruder (L/D=48). Prior to melt mixing these components, the solid materials were dry blended first in a high speed mixer and the liquid materials then added to provide for a uniform distribution of all components. The temperature profile of the extruder was set at 100° C./130° C./160° C./160° C./150° C./140° C. The rotation speed of the screw was set at 300 rpm. A vacuum of −0.06 to −0.08 bar was applied during extrusion. The composition melt was extruded as a strand, air cooled and cut into pellets.

Part B: Preparation of Films Using the Core Polymer Layer Masterbatch or Concentrate of Part A Part B1

The following polymer composition (40 wt % LDJ225 (Qenos); 33 wt % 2045.11G (Dow) 8 wt % HDF895 (Qenos); 15 wt % concentrate of part A and 4 wt % processing aid masterbatch) was blown into 30 micron thick film on a standard LDPE blown film line with an extruder 125 mm diameter, GP screw, smooth barrel, L/D 30:1, Die gap=1.6 mm, BUR>2.2 and process temperatures: Z1: 130° C., Z2: 175° C., Z3: 180° C., A: 180° C., Die: 175° C. The melt temperature was kept below about 190° C. to minimise starch disintegration and discoloration. The processing conditions for film blowing were extruder speed of 25 rpm, line speed of 50 m/min, bubble height of 4.5 m and blow-up ratio of 3:1.

Part B2

Multilayer films were prepared on 3 layer blown film line using the general procedure outlined above in Part B1. Polymer resins/compositions used in the production of the multilayer films are presented below in Table 1.

TABLE 1

Polymer resins/compositions used in the production of the multilayer films.

| Type | Grade | Supplier | MI (g/10 min.) | Density (g/cc) |
|---|---|---|---|---|
| LDPE | DJ225 | Qenos | 2.5 | 0.918 |
| LLDPE | 2045.11G | Dow | 1 | 0.922 |
| LLDPE | 2645.11G | Dow | 0.9 | 0.921 |
| LLDPE | LL601 | Qenos | 1 | 0.925 |
| mLLDPE | 5400 | Dow | 1 | 0.916 |
| HDPE | HDF895 | Qenos | 0.8 | 0.960 |
| LDPE | LD150AC | Exxon Mobil | 0.75 | 0.923 |
| Part A | — | — | 1.2 | 1.18 |

Part B2(a)

A three layer film having a thickness of 30 μm and an ABA structure was prepared, where layers A represent the covering polymer layers and layer B represents the core polymer layer, each layer having the composition shown below in Table 2.

TABLE 2

Polymer composition of layers used in the production of the multilayer films.

| Layer A | Layer B |
|---|---|
| 50 wt % LD150AC | 30 wt % Part A |
| 50 wt % 2645.11G | 70 wt % LD150AC |

The central layer B represented 40% of the overall film thickness and contained 30 wt % of the Part A composition. Layers A each represented 30% of the overall film thickness.

The multilayer film exhibited exceptional clarity. The film had a puncture resistance as measured by drop dart test of 65 gm. In comparison, the monolayer film of Part B1 exhibited relatively poor clarity and a puncture resistance as measured in a drop dart test of only 40 gm.

Part B2(b)

A further three layer film having a thickness of 30 μm and an ABA structure was prepared, where layers A represent the covering polymer layers and layer B represents the core polymer layer, each layer having the composition shown below in Table 3.

TABLE 3

Polymer composition of layers used in the production of the multilayer films.

| Layer A (thickness 7.5 μm) | Layer B (thickness 15 μm) |
|---|---|
| 52 wt % LDJ225 | 30 wt % Part A |
| 40 wt % 2045.11G | 25 wt % 5400 |
| 8 wt % HD895 | 45 wt % 2045.11G |

The multilayer film exhibited exceptional clarity and had a puncture resistance as measured by drop dart test ASTM 1709 of 70 gm.

Part C: Film Optical Properties

Optical properties of the film were tested according to ASTM D 1003 (haze and light transmission) and ASTM D 2457 (gloss). The results are presented below:

Haze (ASTM D 1003) Light Transmission (ASTM D 1003)
ML-C=7.55% ML-C=93.3%
ML-02=53.9% ML-02=92.6%
3L-03=7.02% 3L-03=93.2%
3L-04=6.82% 3L-04=93.1%

Gloss (ASTM D 2457)
ML-C=58.8
ML-02=16.7
3L-03=60.2
3L-04=66.8

Legend:
ML-C=30 μm monolayer control film–100% PE (comparative)
ML-02=Monolayer film as prepared in Part B1 (comparative)
3L-03=Multilayer film as prepared in Part B2(a)
3L-04=Multilayer film as prepared in Part B2(b)

Example 2

Part A: Preparation of Core Polymer Layer Masterbatch or Concentrate 50 kg of corn starch (100 mesh) having a water content of 12-14% 12 kg of glycerol, 10 kg of sorbitol, 18 kg of ethylene acrylic acid (EAA) (9% acid, MFI 10-20 g/10 min), 10 kg VLLDPE (Dow 4404, 2 g/10 mins, density 0.9 g/cm$^3$), 7 kg LDPE (MFI 7 g/10 mins), 0.7 kg calcium stearate, 0.3 kg stearic acid, and 2.0 kg polyethylene wax (melting point range 98-120° C., MFI 3000 g/10 min) were melt mixed in a ZSK-65 Twin Screw Extruder (L/D=48). Prior to melt mixing these components, the solid materials were dry blended first in a high speed mixer and the liquid materials then added to provide for a uniform distribution of all components. The temperature profile of the extruder was set at 100° C./130° C./160° C./160° C./150° C./140° C. The rotation speed of the screw was set at 300 rpm. A vacuum of −0.06 to −0.08 bar was applied during extrusion. The composition melt was extruded as a strand, air cooled and cut into pellets.

Part B: Preparation of Multilayer Films Using the Core Polymer Layer Masterbatch or Concentrate of Part A Multilayer films were prepared on 3 layer blown film line using an extruder 125 mm diameter, GP screw, smooth barrel, L/D 30:1, Die gap=1.6 mm, BUR>2.2 and process temperatures: Z1: 130° C., Z2: 175° C., Z3: 180° C., A: 180° C., Die: 175° C. The melt temperature was kept below about 190° C. to minimise starch disintegration and discoloration. The processing conditions for film blowing were extruder speed of 25 rpm, line speed of 50 m/min, bubble height of 4.5 m and blow-up ratio of 3:1.

Polymer components used in the production of the multilayer films are presented below in Table 4.

TABLE 4

Polymer components used in the production of the multilayer films.

| Type | Grade | Supplier | MFI (g/10 min.) | Density (g/cc) |
|---|---|---|---|---|
| LDPE | DJ225 | Qenos | 2.5 | 0.918 |
| LLDPE | 2645.11G | Dow | 0.9 | 0.921 |
| LLDPE | LL601 | Qenos | 1 | 0.925 |
| LDPE | FD2310 | Borouge | 0.2 | 0.931 |
| Part A | — | — | 1.2 | 1.18 |

A three layer film having a thickness of 60 μm and an ABC structure was prepared, where layers A and C represent the covering polymer layers and layer B represents the core polymer layer, each layer having the composition shown below in Table 5.

TABLE 5

Polymer composition of layers used in the production of the multilayer films.

| Layer A | Layer B | Layer C |
|---|---|---|
| 40 wt % FD2310 | 40 wt % Part A | 70 wt % 2645.11G |
| 60 wt % LL601 | 20 wt % DJ225 | 30 wt % DJ225 |
| — | 40 wt % 2645.11G | — |

The multilayer film exhibited exceptional clarity. The film had a puncture resistance as measured by drop dart test ASTM 1709 of greater than 150 N, a tensile strength as measured by ASTM 638 of greater than 25, a percent elongation to break as measured by ASTM 638 of greater than 300%, and a haze as measured by ASTM D 1003 of 6.3%.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A multilayer film comprising at least a tri-layer structure, said tri-layer structure being made up of a core polymer layer interposed between two covering polymer layers that each comprise polyethylene, wherein the core polymer layer comprises a melt blend of: from about 5 wt % to about 85 wt % polyethylene comprising very low density polyethylene and low density polyethylene, from about 10 to about 80 wt % thermoplastic starch, from about 2 wt % to about 25 wt % ethylene acrylic acid copolymer and from about 0.2 wt % to about 2 wt % polyethylene wax; and wherein the core polymer layer further comprises ethylene vinyl acetate (EVA) copolymer.

2. The multilayer film according to claim 1, wherein the ethylene vinyl acetate copolymer is present in the core polymer layer in an amount ranging from about 0.2 wt % to about 2 wt %.

3. The multilayer film according to claim 1, wherein the polyethylene wax has a melt flow index as measured according to ASTM D1238 ranging from about 2000 to about 4000 g/10 min.

4. The multilayer film according to claim 1, wherein the covering polymer layers each comprise at least 90 wt % of polyethylene, relative to other components present in the respective layers.

5. The multilayer film according to claim 1, further comprising one or more additional layers on one or both of the covering polymer layers.

6. The multilayer film according to claim 1, wherein the tri-layer structure exhibits a haze as measured by ASTM D 1003 of no more than about 25%, relative to the haze as measured according to ASTM D 1003 of the tri-layer structure absent the core polymer layer.

7. The multilayer film according to claim 1, wherein the tri-layer structure exhibits a light transmission as measured by ASTM D 1003 of more than about 75%, relative to the light transmission as measured according to ASTM D 1003 of the tri-layer structure absent the core polymer layer.

8. An article comprising or produced from a multilayer film according to claim 1.

9. The article according to claim 8 in the form of a bag or bubble cushioning packaging.

10. A process for producing a multilayer film comprising at least a tri-layer structure, the process comprising forming the tri-layer structure by coextruding a core polymer layer interposed between two covering polymer layers that each comprise polyethylene, wherein the core layer comprises a melt blend of: from about 5 wt % to about 85 wt % polyethylene comprising very low density polyethylene and low density polyethylene, from about 10 wt % to about 80 wt % thermoplastic starch, from about 2 wt % to about 25 wt % ethylene acrylic acid copolymer, and from about 0.2 wt % to about 2 wt % polyethylene wax; and wherein the core polymer layer further comprises ethylene vinyl acetate (EVA) copolymer.

11. The process according to claim 10, wherein the co-extruded core polymer layer is itself formed by melt processing with polyethylene a melt blended composition comprising said polyethylene, ethylene acrylic acid copolymer, thermoplastic starch, and polyethylene wax.

12. The process according to claim 11, wherein about 60 to 80 wt % of the polyethylene and about 20 to 40 wt % of the melt blended composition comprising said polyethylene, ethylene acrylic acid copolymer, thermoplastic starch, and polyethylene wax are melt processed together.

13. The process according to claim 12, wherein the melt blended composition comprising said polyethylene, ethylene acrylic acid copolymer, thermoplastic starch, and polyolefin wax is itself prepared by melt processing together about 5 to about 25 wt % of polyethylene, about 5 to about 25% of ethylene acrylic acid copolymer, about 50 to about 80 wt % of thermoplastic starch and/or its constituent components, and about 0.2 wt % to about 2 wt % of polyethylene wax.

14. The process according to claim 10, wherein the thermoplastic starch is prepared using starch having a water content ranging from about 5 to 15 wt %.

15. The multilayer film of claim 1, wherein the covering polymer layers each consist essentially of polyethylene.

16. The multilayer film according to claim 1, wherein the core polymer layer comprises a melt blend of: from about 60 wt% to about 85 wt% polyethylene, from about 10 wt % to about 40 wt % thermoplastic starch, from about 2 wt % to about 10 wt % ethylene acrylic acid copolymer, and from about 0.2 wt % to about 2 wt % polyethylene wax.

17. The process according to claim 10, wherein the core polymer layer comprises a melt blend of: from about 60 wt % to about 85 wt % polyethylene, from about 10 wt % to about 40 wt % thermoplastic starch, from about 2 wt % to about 10 wt % ethylene acrylic acid copolymer, and from about 0.2 wt % to about 2 wt % polyethylene wax.

* * * * *